(12) United States Patent
Pilon

(10) Patent No.: US 9,605,463 B2
(45) Date of Patent: Mar. 28, 2017

(54) SNUBBER APPARATUS, E.G., FOR EXCAVATION BUCKET

(75) Inventor: Michel Pilon, Ottawa (CA)

(73) Assignee: GLOBAL CASTING INC., Plessisville (CA)

( * ) Notice: Subject to any disclaimer, the term of this patent is extended or adjusted under 35 U.S.C. 154(b) by 0 days.

(21) Appl. No.: 14/118,311

(22) PCT Filed: May 18, 2012

(86) PCT No.: PCT/CA2012/050328
§ 371 (c)(1),
(2), (4) Date: Nov. 18, 2013

(87) PCT Pub. No.: WO2012/155274
PCT Pub. Date: Nov. 22, 2012

(65) Prior Publication Data
US 2014/0102841 A1    Apr. 17, 2014

Related U.S. Application Data

(60) Provisional application No. 61/605,852, filed on Mar. 2, 2012, provisional application No. 61/588,315, filed
(Continued)

(51) Int. Cl.
*F16F 9/14* (2006.01)
*E05F 5/02* (2006.01)
(Continued)

(52) U.S. Cl.
CPC ............. *E05F 5/022* (2013.01); *E02F 3/4075* (2013.01); *E02F 9/2271* (2013.01); *E05F 5/00* (2013.01);
(Continued)

(58) Field of Classification Search
CPC ....... E02F 9/2207; E02F 3/4075; F16F 9/145; F16F 15/165; F16F 9/36; F16F 9/369; F16F 2230/30
See application file for complete search history.

(56) References Cited

U.S. PATENT DOCUMENTS 1,937,495 A * 11/1933 Mitchell ................. 188/269
2,314,493 A *  3/1943 Guy ....................... 188/306
(Continued)

FOREIGN PATENT DOCUMENTS

| CA | 2308567 | 6/1999 | |
|---|---|---|---|
| GB | 1220578 | 1/1971 | |
| SU | 1043385 A1 * | 9/1983 | ............... F16F 9/12 |

OTHER PUBLICATIONS

Canadian Intellectual Property Office, International Search Report and Written Opinion, International Application No. PCT/CA2012/050328 dated Aug. 9, 2012 (14 pages).

*Primary Examiner* — Bradley King
*Assistant Examiner* — Stephen Bowes
(74) *Attorney, Agent, or Firm* — Norton Rose Fulbright Canada LLP

(57) ABSTRACT

A snubber apparatus comprises a casing defining an inner cavity. A shaft passes through the inner cavity and rotates about its longitudinal axis. The shaft has one or two ends laterally projecting out of the casing and being connected to a moving part of a tool to dampen given motions thereof. A wiper arm is on the shaft so as to rotate therewith the shaft, with a free end in close proximity to the surface portions of the inner cavity. The free end has an arcuate contour complementarily corresponding to a circumferential surface portion. A dam extends from the circumferential surface portion into close proximity to the wiper arm, to divide the inner cavity in two chambers, with movements of the wiper arm changing the volume of the chambers. A hydraulic
(Continued)

circuit controls a flow of fluid between chambers to oppose a force to rotation of the shaft.

12 Claims, 6 Drawing Sheets

Related U.S. Application Data on Jan. 19, 2012, provisional application No. 61/487,730, filed on May 19, 2011.

(51) Int. Cl.
*E02F 3/407* (2006.01)
*E02F 9/22* (2006.01)
*E05F 5/00* (2017.01)

(52) U.S. Cl.
CPC ........... *F16F 9/145* (2013.01); *E05Y 2201/21* (2013.01); *E05Y 2201/254* (2013.01); *E05Y 2201/266* (2013.01); *E05Y 2201/408* (2013.01); *E05Y 2800/407* (2013.01); *E05Y 2800/422* (2013.01); *E05Y 2900/518* (2013.01)

(56) References Cited

U.S. PATENT DOCUMENTS

| | | | | |
|---|---|---|---|---|
| 2,836,473 | A * | 5/1958 | Tydeman | F16C 25/083 384/563 |
| 3,419,114 | A * | 12/1968 | Rumsey | 188/280 |
| 3,698,521 | A * | 10/1972 | Taylor | 188/306 |
| 4,411,341 | A | 10/1983 | Schultz | |
| 4,609,081 | A | 9/1986 | Hungerford | |
| 4,723,639 | A * | 2/1988 | Hungerford | 188/307 |
| 5,061,089 | A * | 10/1991 | Bair | F16C 19/54 384/517 |
| 5,974,705 | A | 11/1999 | Isley et al. | |
| 2006/0191756 | A1* | 8/2006 | Moradian | 188/296 |
| 2006/0237271 | A1 | 10/2006 | Athanasiou | |
| 2009/0159382 | A1 | 6/2009 | Chemouni et al. | |
| 2009/0198411 | A1* | 8/2009 | Kohls | 701/36 |

* cited by examiner

SNUBBER APPARATUS, E.G., FOR EXCAVATION BUCKET

CROSS-REFERENCE TO RELATED APPLICATION(S)

The present application claims priority on U.S. Provisional Application No. 61/487,730, filed May 19, 2011, U.S. Provisional Application No. 61/588,315, filed on Jan. 19, 2012, and U.S. Provisional Application No. 61/605,852, filed on Mar. 2, 2012, all of which are incorporated herein by reference.

FIELD OF THE APPLICATION

The present application relates to snubber apparatuses for damping movements of doors on an excavator bucket, for instance.

BACKGROUND OF THE ART

Some commonly used excavators have an excavation bucket mounted at the end of a boom. The excavation bucket has an open front side, while a door on its rear side. The lower edge of the open front side has teeth for excavating.

The excavator first scoops up dirt with the rear-side door of the bucket closed. The boom then moves so that the bucket is above a dropping zone (e.g., a truck), at which point the rear-side door of the bucket faces downward. The door is then opened, for instance by the release of a latch. The door opens under its weight and the weight of the dirt in the bucket, whereby the dirt is dumped. To close the door, the latch grabs the door when the excavation bucket is moved to scoop up another load of dirt.

A common problem with such excavator configurations is that the door of the excavation bucket is subjected to violent impact. This may lead to the premature wear of the doors, and costly repairs and downtime. Accordingly, snubbers also known as brakes, dampers, mechanical snubbers, etc, are used to reduce oscillation of the door, therefore reducing the impact at closing of the door.

Hydraulic snubbers feature a pair of chambers separated by a wiper, with the wiper moving with the excavation door to change the volume of the chambers. A fluid (e.g., hydraulic oil) moves between chambers, and this flow is controlled to oppose torque to the movement of the door. However, the various components of such hydraulic snubbers are subjected to high pressures and wear, in addition to being exposed to the elements (e.g., temperature variations), which may affect the performance and durability of the snubbers.

SUMMARY OF THE APPLICATION

It is therefore an aim of the present disclosure to provide a snubber apparatus that addresses issues associated with the prior art.

Therefore, in accordance with a first embodiment the present application, there is provided a snubber apparatus comprising: a casing defining an inner cavity delimited at least by a circumferential surface portion between a pair of lateral surface portions, the circumferential surface portion having an arcuate profile from one of the lateral surfaces to the other of the lateral surface portions, the casing adapted to be secured to a tool; a shaft passing through the inner cavity of the casing and rotatably supported to rotate about its longitudinal axis, the shaft having at least one end laterally projecting out of the casing, the at least one end of the shaft adapted to be connected to a moving part of the tool to dampen given motions of the moving part of the tool; a wiper arm on the shaft so as to rotate with the shaft, the wiper arm having a free end in close proximity to the surface portions of the inner cavity of the casing, the free end of the wiper arm having an arcuate contour complementarily corresponding to the arcuate profile of the circumferential surface portion of the inner cavity; a dam extending from the circumferential surface portion toward a center of the inner cavity of the casing in close proximity to one of the shaft and wiper arm, to divide the inner cavity in two chambers adapted to accommodate a fluid, with movements of the wiper arm changing the volume of the chambers; and a hydraulic circuit in fluid communication with the chambers and adapted to control a flow of the fluid from one of the chambers to the other to oppose a force to rotation of the shaft via the wiper arm.

Further in accordance with the first embodiment, the hydraulic circuit comprises an accumulator adapted to receive a portion of the fluid as a result of a volume variation of the fluid caused by a thermal variation.

Still further in accordance with the first embodiment, the hydraulic circuit is part of a manifold block releasably connected to the casing.

Still further in accordance with the first embodiment, the wiper arm is connected to the shaft by a spline arrangement.

Still further in accordance with the first embodiment, the arcuate contour of the free end of the wiper arm has a semicircular shape.

Still further in accordance with the first embodiment, the wiper arm has a quasi-cylindrical tubular portion from which projects the free end.

Still further in accordance with the first embodiment, the wiper arm has a continuous surface comprising radial surface portions of the quasi-cylindrical tubular portion, and the arcuate contour of the free end.

Still further in accordance with the first embodiment, a loop channel is defined in the continuous surface of the wiper arm, with portions of the loop channel in the radial surface portions surrounding a bore in the quasi-cylindrical tubular portion, and a pair of spaced apart portions in the arcuate contour merging with the portions of the loop channel and radial surface portions, and further comprising a single seal in the loop channel.

Still further in accordance with the first embodiment, a circular channel is in each of the radial surface portions about a bore in the quasi-cylindrical tubular portion, and further comprising a seal in each of the circular channels.

Still further in accordance with the first embodiment, at least one pressure relief valve is in the dam and in fluid communication with the chambers.

Still further in accordance with the first embodiment, two of the pressure release valves are in the dam, the pressure relief valves operating in opposite directions.

Still further in accordance with the first embodiment, the circumferential surface portion of the inner cavity corresponds to an outer circumferential surface of a torus.

Still further in accordance with the first embodiment, the casing has a keyway in the inner cavity, with an end of the dam being received in the keyway.

Still further in accordance with the first embodiment, the shaft is rotatably supported to the casing by at least a pair of tapered roller bearings on opposite sides of the wiper arm.

Still further in accordance with the first embodiment, the tool is an excavation bucket, and the moving part is a door of the excavation bucket.

In accordance with a second embodiment of the present disclosure, there is provided a snubber apparatus comprising: a casing defining an inner cavity defined by a circumferential surface portion between a pair of lateral surface portions, the casing adapted to be secured to a tool; a shaft passing through the inner cavity of the casing and rotatably supported to rotate about its longitudinal axis, the shaft having at least one end laterally projecting out of the casing, the at least one end of the shaft adapted to be connected to a moving part of the tool to dampen given motions of the moving part of the tool; a wiper arm on the shaft so as to rotate with the shaft, the wiper arm having a free end in close proximity to the surface portions of the inner cavity of the casing; a dam extending from the circumferential surface portion toward a center of the inner cavity of the casing in close proximity to one of the shaft and wiper arm, to divide the inner cavity in two chambers adapted to accommodate a fluid, with movements of the wiper arm changing the volume of the chambers; a hydraulic circuit in fluid communication with the chambers and adapted to control a flow of the fluid from one of the chambers to the other to oppose a force to rotation of the shaft via the wiper arm; and at least one pressure relief valve in the dam and in fluid communication with the chambers.

Further in accordance with the second embodiment, the hydraulic circuit comprises an accumulator adapted to receive a portion of the fluid as a result of a volume variation of the fluid caused by a thermal variation.

Still further in accordance with the second embodiment, the hydraulic circuit is part of a manifold block releasably connected to the casing.

Still further in accordance with the second embodiment, the casing has a keyway in the inner cavity, with an end of the dam being received in the keyway.

Still further in accordance with the second embodiment, two of the pressure release valve are in the dam, the pressure relief valves operating in opposite directions.

Still further in accordance with the second embodiment, the shaft is rotatably supported to the casing by at least a pair of tapered roller bearings on opposite sides of the wiper arm.

Still further in accordance with the second embodiment, the hydraulic circuit comprises two branches operating in opposite directions between the chambers, each said branch comprising a flow control device and a pressure-relief valve.

In accordance with a third embodiment of the present disclosure, there is provided a snubber apparatus comprising: a casing having a body defining a circumferential surface portion of an inner cavity, and end plates releasably secured to opposite sides of the body and defining a pair of lateral surface portions of the inner cavity, the casing adapted to be secured to a tool; a shaft passing through the inner cavity of the casing, the shaft having at least one end projecting out of the casing, the at least one end of the shaft adapted to be connected a moving part of the tool to dampen given motions of the moving part of the tool; a wiper arm on the shaft so as to rotate with the shaft, the wiper arm having a free end in close proximity to the surface portions of the inner cavity of the casing; a dam extending from the circumferential surface portion toward a center of the inner cavity of the casing in close proximity to one of the shaft and wiper arm, to divide the inner cavity in two chambers adapted to accommodate a fluid, with movements of the wiper arm changing the volume of the chambers; a hydraulic circuit in fluid communication with the chambers and adapted to control a flow of the fluid from one of the chambers to the other to oppose a force to rotation of the shaft via the wiper arm; and at least a pair of tapered roller bearings mounted to the end plates and rotatably supporting the shaft on opposed sides of the wiper arm.

Further in accordance with the third embodiment, a circular channel is in each of radial surface portions of the wiper arm, and further comprising a seal in each of the circular channels, to seal a space between the lateral surface portions of the end plates and the wiper arm.

Still further in accordance with the third embodiment, at least one pressure relief valve is in the dam and in fluid communication with the chambers.

Still further in accordance with the third embodiment, two of the pressure release valves are in the dam, the pressure relief valves operating in opposite directions.

Still further in accordance with the third embodiment, the casing has a keyway in the inner cavity, with an end of the dam being received in the keyway.

Still further in accordance with the third embodiment, both ends of the shaft project out of the casing through throughbores in the end plates.

DESCRIPTION OF THE PREFERRED EMBODIMENTS

Figure 1:
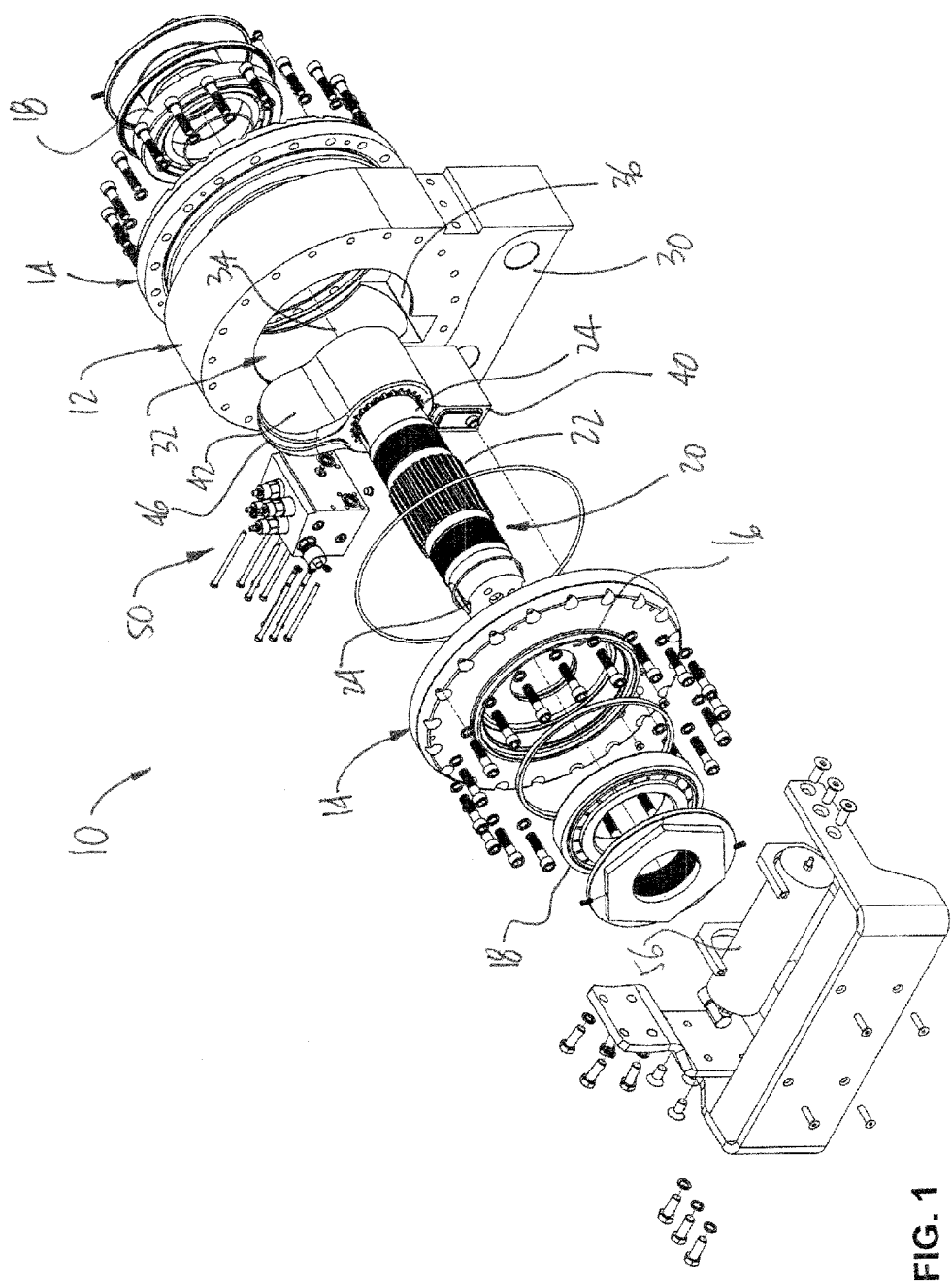
FIG. 1 is an assembly view of a snubber apparatus in accordance with an embodiment of the present disclosure.
Figure 2:
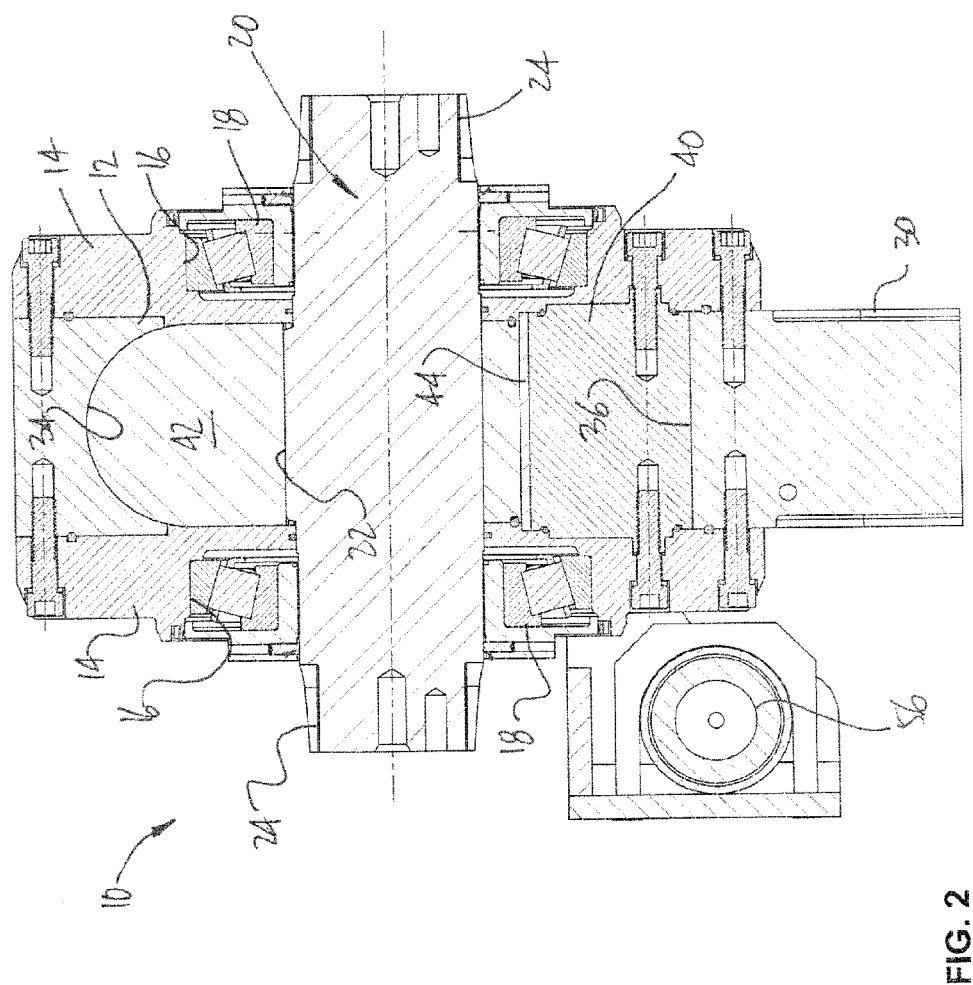
FIG. 2 is a sectional view of the snubber apparatus of FIG. 1.

Referring to the drawings and more particularly to FIGS. 1 and 2, there is illustrated a snubber apparatus 10 in accordance with the present disclosure. The snubber apparatus 10 is of the type used in conjunction with an excavation bucket to dampen movements of the bucket door, as known in the art. The snubber apparatus 10 may also be known as a damper, snubber, hydraulic brake, among other possible names.

The snubber apparatus 10 has a casing 12. The casing 12 defines a structural component of the snubber apparatus 10, and is fixed to the excavation bucket in conventional fashion. End plates 14 are connected to opposite lateral sides of the casing 12, to form an inner cavity of the snubber apparatus 10. Appropriate fasteners may for instance be used as shown in FIG. 1.

The end plates 14 may both be annular in shape, for a snubber configuration as shown in FIGS. 1 and 2 in which ends of a shaft project out of both end plates 14. However, the snubber apparatus 10 may have a shaft with a single projecting end as well.

The end plates 14 each have a housing for receiving a bearing 18. Accordingly, the bearings 18 rollingly support snubber shaft 20, such that the snubber shaft 20 may rotate along its longitudinal axis. In an embodiment, the bearings 18 are tapered roller bearings, although other types of bearings may be used as well. As will be described hereinafter, tapered roller bearings are well suited to be used with the snubber apparatus 10.

Appropriates seals are provided between the various components set forth above, to ensure that the snubber apparatus 10 is relatively leakproof, and thus to keep a fluid inside the snubber apparatus 10. The seals must be compatible with the type of fluid used and associated pressures. For instance, the seals may be O-rings, among other possibilities, and are positioned between the end plates 14 and the casing 12, between the bearings 18 and a surface of the end plates 14/housings 16.

Still referring to FIGS. 1 and 2, the snubber shaft 20 may have a splined section 22. The splined section 22 is centrally located along the longitudinal axis of the shaft 20 when the shaft 20 has both ends projecting out of the casing 12, as in the illustrated embodiment. If the shaft 20 has a single projecting end, the splined section 22 could be off-centered relative to the longitudinal dimension of the shaft 20.

The shaft 20 has one or two connection ends 24 (two in FIGS. 1 and 2), by which the snubber apparatus 10 is interfaced to the excavation door. The connection ends 24 may have any appropriate configuration as a function of the linkages they will be connected to.

The casing 12 has a bracket 30 at its bottom end, and is connected to the excavation bucket or any other tool by the bracket 30. The bracket 30 may have any appropriate configuration, in addition to the configuration illustrated in FIGS. 1 and 2, dependent on the tool to which the snubber apparatus 10 is connected.

The casing 12 has an inner cavity 32 that has a generally circular shape in a radial plane. In FIGS. 1 and 2, the inner cavity 32 has a circumferential surface portion 34 being that of a torus, between lateral surface portions defined by the end plates 14. However, the circumferential surface portion 34 may adopt any arcuate profile (ellipse, square, etc) extending from one of the lateral surface portion to the other of the lateral surface portion of the inner cavity 32, as alternatives to the semi-circular profile of the torus. A keyway 36 may be defined through the casing 12, to disrupt the circumferential surface portion 34. The keyway 36 receives an end of dam 40 (a.k.a., fixed arm or the like). Alternatively, the dam 40 may have an end shaped as a function of the shape of the circumferential surface portion 34.

Figure 3:
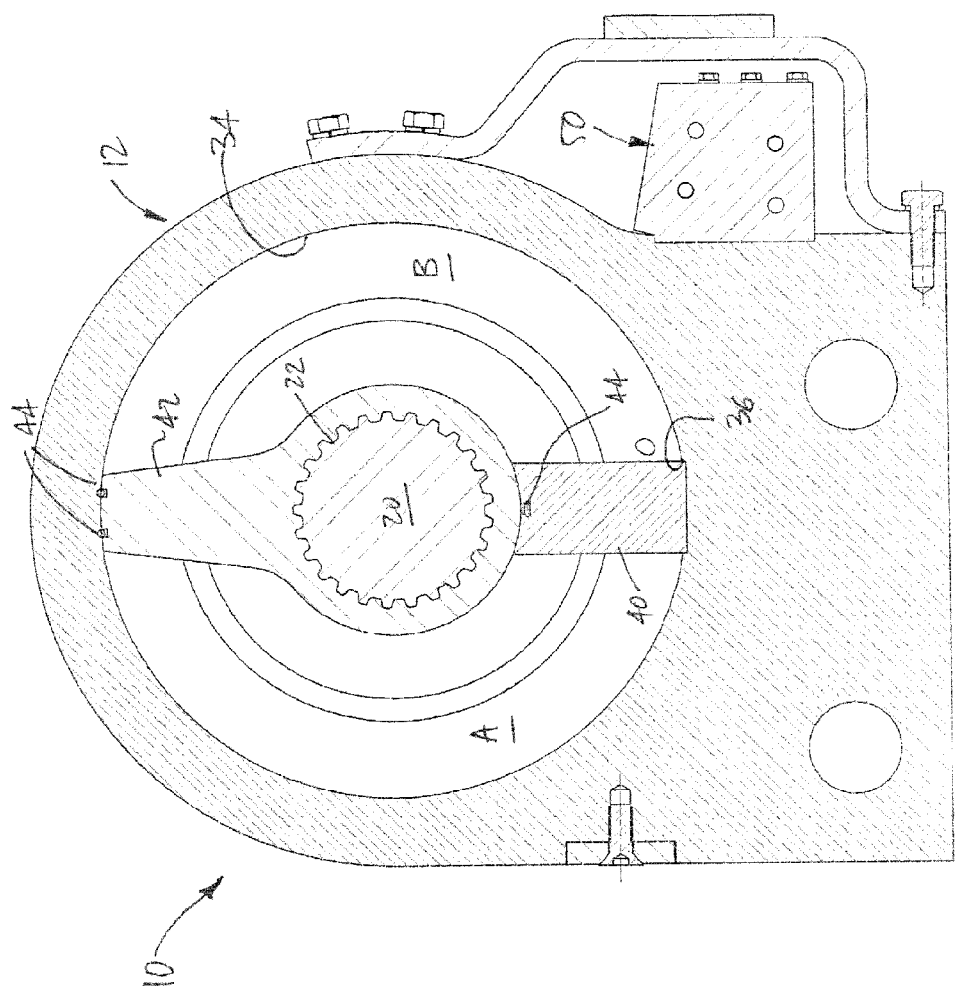
FIG. 3 is a side centre section view of the snubber apparatus of FIG. 1.

Referring to FIG. 3, the dam 40 is shown projecting upwardly into the inner cavity 32, toward a wiper arm 42. A free end of the dam 40 is in close proximity (i.e., in contact or separated by a small gap) to a quasi-cylindrical surface of the wiper arm 42. In an embodiment, with seals 44 on the free end of the dam 40 contacting the surface of the wiper arm 42. The wiper arm 42 may have a quasi-cylindrical tubular portion (defining the quasi-cylindrical surface) that is mounted to the shaft 20. A bore in the tubular portion is shaped as a function of the section 22 of the shaft 20. In FIG. 3, the section 22 and the bore of the wiper arm 42 are correspondingly splined. The spline configurations allows some form of translation of the wiper arm 42 along the shaft 20, with integral rotation of the shaft 20 with the wiper arm 42. However, other similar configurations are also considered such as keyway(s) and other mechanical connections, for the integral rotation of the shaft 20 and wiper arm 42.

The wiper arm 42 has a flap portion (i.e., its free end) projecting from the tubular portion. The free end of the wiper arm 42 is in close proximity (i.e., in contact or separated by a small gap) with the circumferential surface portion 34 of the inner cavity 32 of the casing 12. The free end of the wiper arm 42 has an arcuate contour corresponding to the arcuate profile of the circumferential surface portion 34 of the inner cavity 32. Moreover, as seen in FIG. 1, the wiper arm 42 may define a continuous surface comprising radial surface portions of the tubular portion of the wiper arm 42 and the arcuate contour. According to an embodiment, the arcuate contour of the wiper arm 42 is semicircular. Other embodiments are possible, with separate surfaces, as opposed to a single continuous surface.

A seal 46 may be embedded in a loop channel on the continuous surface of the wiper arm 42. In an embodiment, the seal 46 is a wiper seal or the like that circuits about the periphery of the flap portion (free end) and the lateral sides (comprising the radial surface portions), and thus contacts the circumferential surface portion 34 and the end plates 14. Accordingly, the seal 46 sealingly isolates the shaft 20 and the outer and lateral surfaces of the wiper arm 42. The seal 46 on the wiper arm 42 can be made of any appropriate material, such as an elastomer, synthetic materials, metallic materials or any other product or combination of products.

Figure 5:
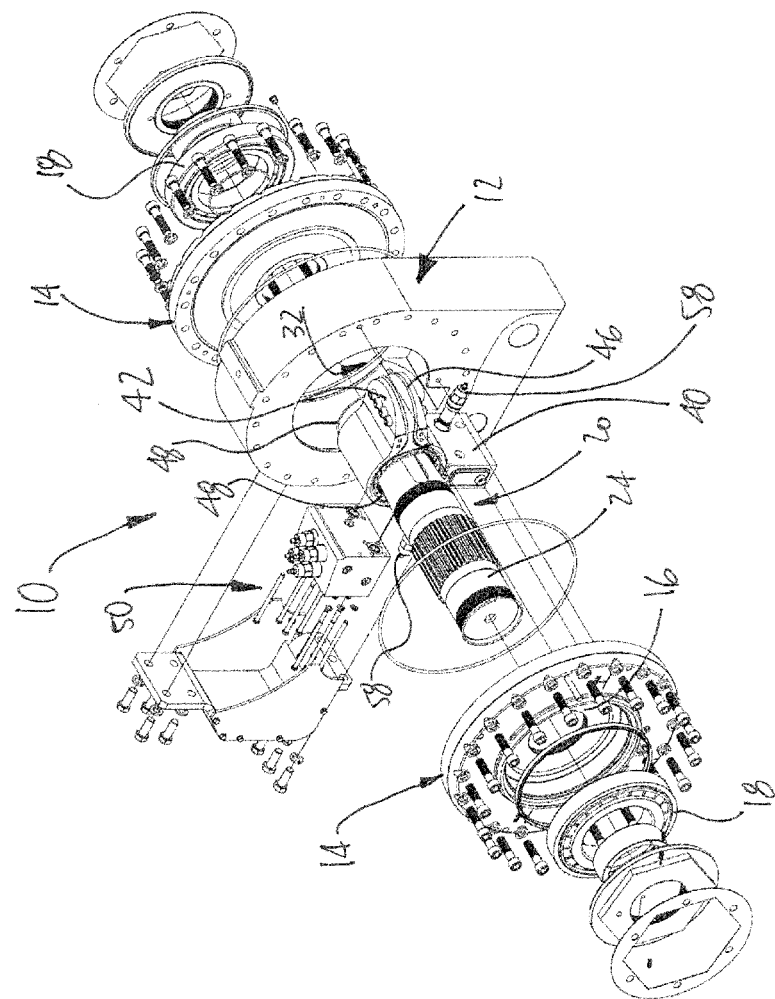
FIG. 5 is an assembly view of a snubber apparatus in accordance with yet another embodiment of the present disclosure.

As shown in FIG. 5, circular seals 48 may be provided in a circular channel on the lateral sides of the wiper arm 42. The seals 48 surround the shaft 20 and therefore define a level of sealing between the wiper arm 42 and the end plates 14. For instance, the seals 48 may be O-rings or wiper seals of appropriate material compatible with oil.

According to another embodiment, the wiper arm 42 comes directly into contact with the circumferential surface portion 34 and the end plates 14, without the presence of the seal 46. In such a case, the material of the wiper arm is selected to allow direct contact. For instance, aluminum-bronze (and alternatives nytralon, UHMW polyethylene, etc) can be used for the metallic parts contacting one another, such as the dam 40, the wiper arm 42. It is also considered to provide inserts on the end plates 42 projecting into the inner cavity 32 for direct contact with the wiper arm 42.

The wiper arm 42 can be made of a single piece or of multiple parts of different materials. For instance, the tip of the wiper arm 42 may separate from a remainder of the wiper arm 42, to facilitate replacement thereof. It is also considered to provide removable guides on the lateral sides of the wiper arm 42, which lateral sides are opposite the end plates 14, with the removable guides acting as wear plates (e.g., made of aluminum-bronze or the like).

Still referring to FIG. 3, the dam 40 separates the inner cavity 32 into two chambers, namely chambers A and B. As the wiper arm 42 rotates in orientation C, the volume of the chambers A and B varies in proportionally-opposite linear fashion. Therefore, fluid in the inner cavity 32 moves from one of the chambers to the other, passing through hydraulic control block 50. The hydraulic control block 50 may be removably connected to the casing 12. The hydraulic control block 50 is described in further detail hereinafter, and is used to cause flow restrictions to oppose a force to the rotation of the shaft 20. This torque will therefore dampen movement of the door connected to the shaft 20.

Figure 6:
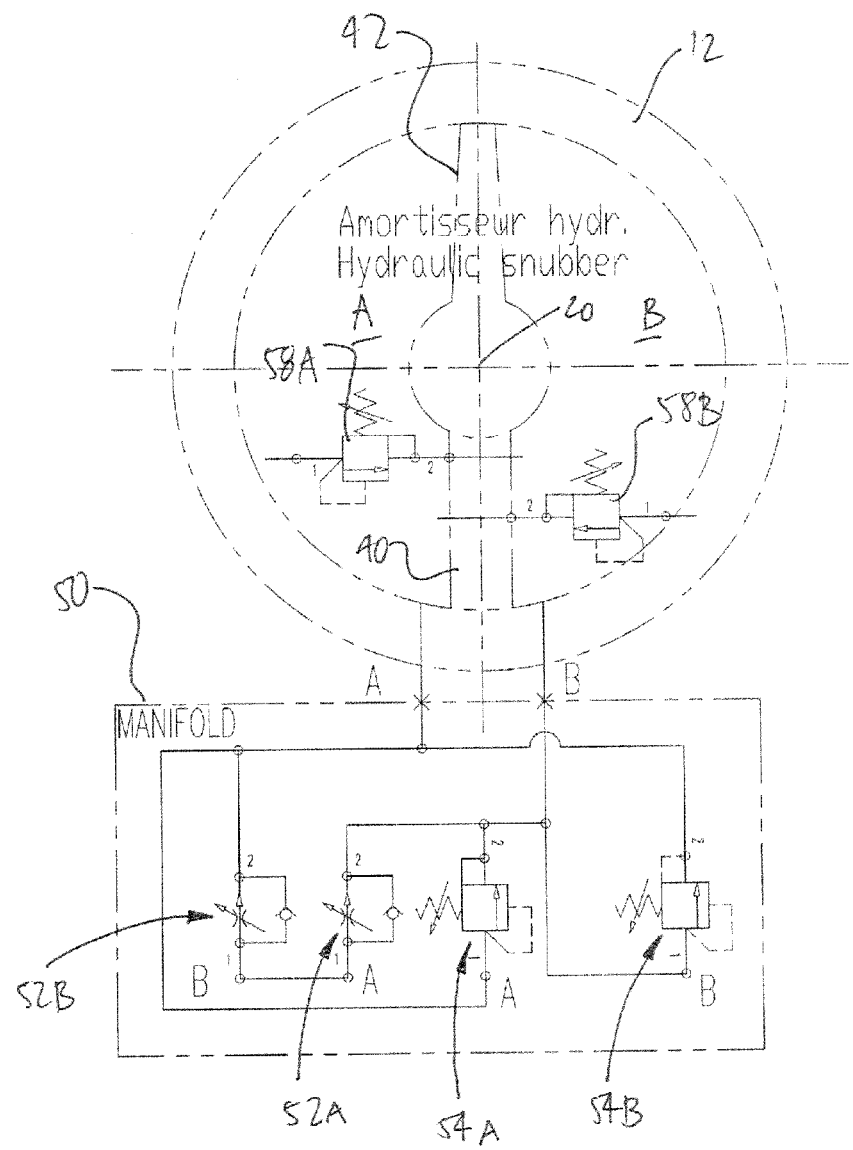
FIG. 6 is a schematic diagram of a hydraulic circuit used with the snubber apparatus of FIG. 1.

Referring to FIG. 6, a hydraulic circuit that may be used in the hydraulic control block 50 is schematically illustrated. The hydraulic circuit has appropriate hydraulic lines in fluid communication with ports respectively in the chambers A and B of the snubber apparatus 10. Accordingly, the fluid in the casing 12 flows between chambers by passing through the hydraulic lines of the hydraulic circuit of FIG. 6.

The hydraulic circuit has a pair of flow restrictor units 52, labeled as 52A and 52B as a function of their operative relation to chamber A or chamber B. The flow restrictor units 52 each consist of a flow restrictor valve and a one-way valve (e.g., check valve). The flow restrictor valve is adjustable (e.g., manually) to control a flow of fluid therethrough, while the one-way valve allows flow in a single direction, in conventional fashion.

The hydraulic circuit also has a pair of pressure-relief valves 54, labeled as 54A and 54B as a function of their operative relation to chamber A or chamber B. The pressure-relief valves 54 are commonly known to open when the pressure at the inlet is at or above a given pressure threshold, to relieve from excess pressure. However, in some circumstances, the snubber apparatus 10 does not need any pressure-relief valves 54.

A piston accumulator 56 may also be provided in fluid communication with the hydraulic circuit, and is shared between the chambers A and B, although a pair of accumulators 56 could be used as well. A pressurized gas is typically captive in the accumulator 56, to maintain a minimum pressure therein. For instance, nitrogen-filled accumulators 56 are commonly used in hydraulic circuits. However, in some circumstances, the snubber apparatus 10 does not need any accumulator 56.

When the wiper arm 42 moves to reduce the volume of chamber A, and incidentally increases the volume of chamber B, fluid flows from the chamber A into the hydraulic circuit. The fluid will be stopped by the pressure-relief valve 54B, but will pass through the check valve of the flow restrictor unit 52B to reach the flow restrictor unit 52A.

At the flow restrictor unit 52A, the check valve will be blocked, whereby fluid will flow through the flow restrictor valve, being restricted by the flow restrictor valve and therefore resulting torque on the shaft 20 via the wiper arm 42.

Concurrently, pressure will increase on the pressure-relief valve 54A, until a threshold pressure is reached at which point the pressure-relief valve 54A will open to let the fluid pass therethrough and reach the chamber B.

When the wiper arm 42 moves to reduce the volume of chamber B, the opposite sequence occurs.

The accumulator 56 is in fluid communication with chamber B, and will receive fluid in the event of an increase in volume of the fluid due to thermal variation. As the fluid will increase in volume on both sides of the wiper arm 42, the fluid from chamber A can move into the accumulator 56 through the flow restrictor 52A or from chamber B directly into the accumulator. Alternatively, the accumulator 56 could be in fluid communication with chamber A. The inlet to the accumulator 56 may be selected to constrain the flow of fluid therein, so as not to impede the normal operation of the wiper arm 42 in damping mode. Any other appropriate hydraulic circuit may be used as an alternative to the circuit of FIG. 6. The above-described circuit has components that can readily be changed.

For instance, one or more pressure-relief valves 58 could be located directed at the outlet of the chambers A and B, for instance on either side of the dam 40. In an embodiment, the pressure-relief valves 58 are directly in the dam 40. Hence, by having the pressure-relief valves 58 closer to the dam 40, the amount of the time during which the circuits of the hydraulic control block 50 would be exposed to the pressure boost would be reduced when compared to a circuit relying solely on the pressure-relief valves 54. In an embodiment, the hydraulic control block 50 could operate with the pressure-relief valves 58 and without the pressure-relief valves 54.

Figure 4:
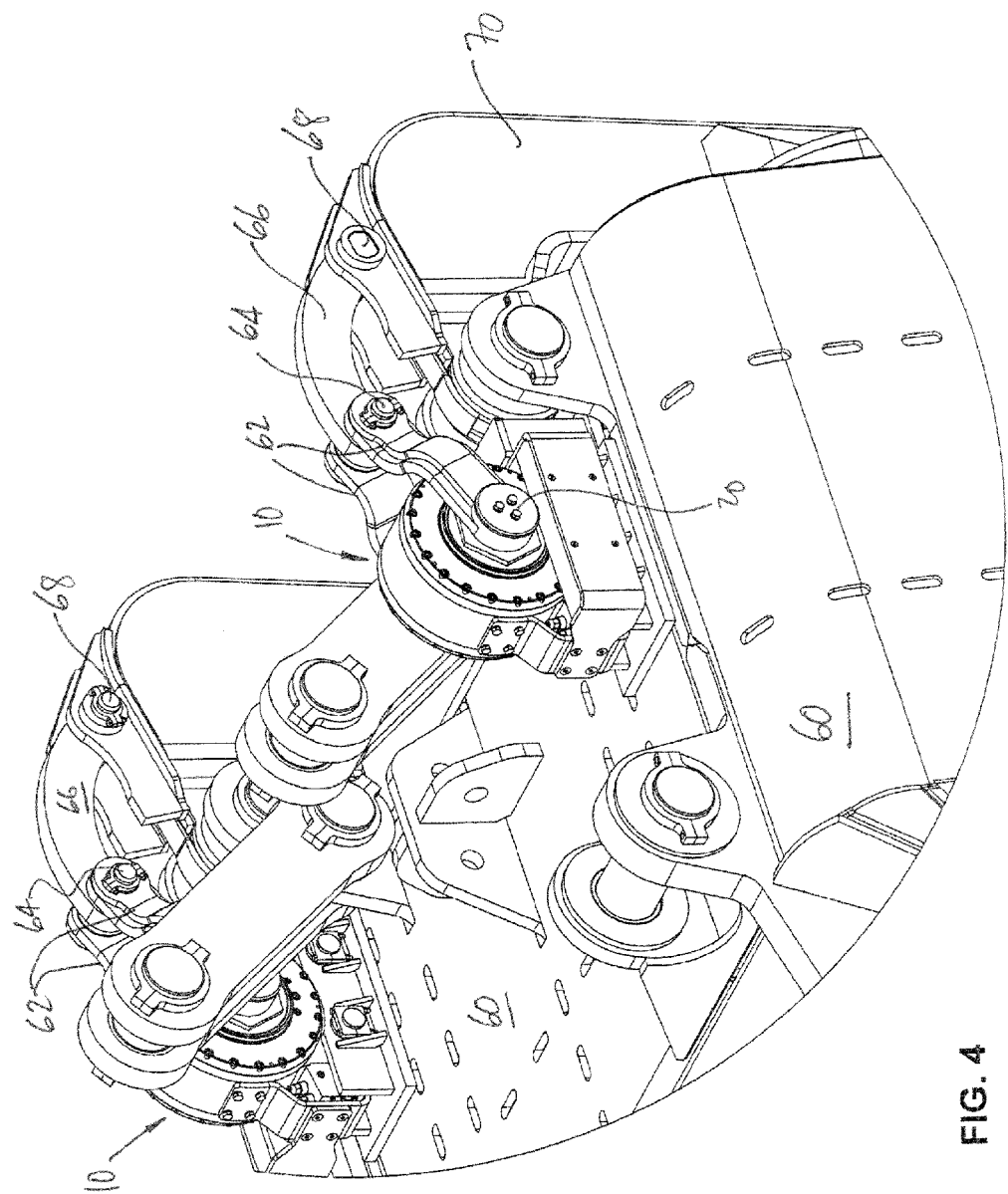
FIG. 4 is an enlarged perspective view of snubber apparatuses mounted to an excavation bucket.

Referring to FIG. 4, a pair of the snubber apparatus 10 are secured to an excavation bucket 60, with the shafts 20 being parallel to one another. The snubber apparatuses 10 both have their output shaft 20 connected by pairs of linkages 62 to a respective pivot 64 (although a single of the linkages 62 may be used per snubber apparatus 10). The pivots 64 are in turn connected via linkages 66 to hinges 68, with the hinges 68 being integral with the door 70. Therefore, movement of the door (shown in a closed position in FIG. 5), will result in a transmission of a rotation to the shafts 20. The snubber apparatuses 10 will therefore dampen the rotation of the shafts 20 as described previously. It is pointed out that the configuration shown in FIG. 4 is for illustrative purposes only. A single snubber apparatus 10 may be used with a tool such as the excavation bucket 60. Moreover, any appropriate linkage configuration may be used to convert an opening/closing movement of the door 70 to a rotation of the shaft 20.

The bearings 18 are preferably tapered roller bearings to absorb some of the pressure on the shaft 20. Tapered roller bearings are known to withstand axial pressures, and are therefore well suited to be used to support the shaft 20.

The invention claimed is:

1. A snubber apparatus comprising:
   a casing defining an inner cavity delimited at least by a circumferential surface portion between a pair of lateral surface portions, the circumferential surface portion having an arcuate profile from one of the lateral surfaces to the other of the lateral surface portions, the casing adapted to be secured to a tool;
   a shaft passing through the inner cavity of the casing and rotatably supported to rotate about its longitudinal axis, the shaft having at least one end laterally projecting out of the casing, the at least one end of the shaft adapted to be connected to a moving part of the tool to dampen given motions of the moving part of the tool;
   a wiper arm on the shaft so as to rotate with the shaft, the wiper arm having a free end in close proximity to the surface portions of the inner cavity of the casing, the free end of the wiper arm having an arcuate contour complementarily corresponding to the arcuate profile of the circumferential surface portion of the inner cavity, and a tubular portion through which passes the shaft, the wiper arm having at least one single continuous loop channel defined in the surface of the wiper arm, with portions of the loop channel surrounding the shaft in opposed axial surface portions of the tubular portion, and a pair of spaced apart portions of the loop channel in the arcuate contour connected to the portions of the loop channel in the axial surface portions;
   a single seal in the continuous loop channel;
   a dam extending from the circumferential surface portion toward a center of the inner cavity of the casing in close proximity to one of the shaft and wiper arm, to divide the inner cavity in two chambers adapted to accommodate a fluid, with movements of the wiper arm changing the volume of the chambers; and
   a hydraulic circuit in fluid communication with the chambers and adapted to control a flow of the fluid from one of the chambers to the other to oppose a force to rotation of the shaft via the wiper arm.

2. The snubber apparatus according to claim 1, wherein the hydraulic circuit comprises an accumulator adapted to receive a portion of the fluid as a result of a volume variation of the fluid caused by a thermal variation.

3. The snubber apparatus according to claim 1, wherein the hydraulic circuit is part of a manifold block releasably connected to the casing.

4. The snubber apparatus according to claim 1, wherein the wiper arm is connected to the shaft by a spline arrangement.

5. The snubber apparatus according to claim 1, wherein the arcuate contour of the free end of the wiper arm has a semicircular shape.

6. The snubber apparatus according to claim 5, wherein the wiper arm has a cylindrical tubular portion from which projects the free end.

7. The snubber apparatus according to claim 6, wherein the wiper arm has a continuous surface comprising the axial surface portions of the cylindrical tubular portion, and the arcuate contour of the free end.

8. The snubber apparatus according to claim 7, further comprising a circular channel in each of the axial surface portions about a bore in the cylindrical tubular portion, and further comprising a seal in each of the circular channels.

9. The snubber apparatus according to claim 1, wherein the circumferential surface portion of the inner cavity corresponds to an outer circumferential surface of a torus.

10. The snubber apparatus according to claim 1, wherein the casing has a keyway in the inner cavity, with an end of the dam being received in the keyway.

11. The snubber apparatus according to claim 1, wherein the shaft is rotatably supported to the casing by at least a pair of tapered roller bearings on opposite sides of the wiper arm, the tapering of each said tapered roller bearing being oriented toward the wiper arm.

12. The snubber apparatus according to claim 1, wherein the tool is an excavation bucket, and the moving part is a door of the excavation bucket.

* * * * *